United States Patent
Hendriks (10) Patent No.: US 7,184,385 B2
(45) Date of Patent: Feb. 27, 2007

(54) OPTICAL SCANNING DEVICE

(75) Inventor: Bernardus Hendrikus Wilhelmus Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 149 days.

(21) Appl. No.: 10/528,947

(22) PCT Filed: Sep. 15, 2003

(86) PCT No.: PCT/IB03/04031

§ 371 (c)(1),
(2), (4) Date: Mar. 23, 2005

(87) PCT Pub. No.: WO2004/029937

PCT Pub. Date: Apr. 8, 2004

(65) Prior Publication Data

US 2006/0039055 A1    Feb. 23, 2006

(30) Foreign Application Priority Data

Sep. 27, 2002    (EP)    .................................. 02078997

(51) Int. Cl.
*G11B 7/135* (2006.01)
(52) U.S. Cl. .............................. 369/112.08; 369/112.26
(58) Field of Classification Search ............. 369/275.1, 369/112.01, 112.08, 112.26
See application file for complete search history.

(56) References Cited

U.S. PATENT DOCUMENTS

| | | | |
|---|---|---|---|
| 6,185,168 B1 | 2/2001 | Kato et al. | |
| 6,707,607 B2 * | 3/2004 | Hendriks et al. | ............ 359/565 |
| 6,947,368 B2 * | 9/2005 | Hendriks et al. | ...... 369/112.26 |
| 2002/0105733 A1 * | 8/2002 | Hendriks et al. | ............ 359/719 |
| 2003/0035356 A1 * | 2/2003 | Stallings et al. | .......... 369/53.19 |
| 2003/0103270 A1 * | 6/2003 | Hendriks | ..................... 359/719 |
| 2004/0145809 A1 * | 7/2004 | Brenner | ...................... 359/569 |

FOREIGN PATENT DOCUMENTS

| | | |
|---|---|---|
| EP | 01204786 B1 | 3/2003 |
| WO | WO0112882 A1 | 2/2001 |
| WO | WO0148746 A1 | 7/2001 |

* cited by examiner

*Primary Examiner*—Wayne Young
*Assistant Examiner*—Minerva Rivero
(74) *Attorney, Agent, or Firm*—Michael E. Belk (57) ABSTRACT

An optical scanning device (1) is for scanning two information layers (2, 2') with two radiation beams (4) in two operating modes. It comprises a radiation source (7) for emitting the two radiation beams, an objective lens system (8) for converging the two beams on the positions of the two information layers, and a phase structure (24) having an optical axis (19) and including a central part ($P_1$) and at least one marginal part ($P_2$) for forming a non-periodic stepped profile in the radial direction. One ($P_2$) of said central and marginal parts ($P_1$, $P_2$) includes at least two segments ($AS_{2,1}$, $AS_{2,2}$) having two different step heights ($h_{2,1}$, $h_{2,2}$), respectively, for introducing in said first operating mode two wavefront modifications $W_{2,1,1}$? and $W_{2,2,1}$?, respectively, and in said second operating mode two wavefront modifications $W_{2,1,2}$? and $W_{2,2,2}$?, respectively, where the difference ($W_{2,1,2}+?W_{2,2,2})-(?W_{2,1,1}+?W_{2,2,1}?)$ is asymmetric.

12 Claims, 9 Drawing Sheets

OPTICAL SCANNING DEVICE

The present invention relates to an optical scanning device for scanning a first information layer by means of a first radiation beam in a first operating mode and a second information layer by means of a second radiation beam in a second operating mode, the device comprising:

a radiation source for emitting said first and second radiation beams consecutively or simultaneously, an objective lens system for converging said first and second radiation beams on the positions of said first and second information layers, respectively, and a phase structure arranged in the optical path of said first and second radiation beams, the structure having an optical axis and including a central part and at least one marginal part for forming a non-periodic stepped profile in the radial direction.

The present invention also relates to a phase structure for use in such an optical scanning device.

"Scanning an information layer" refers to scanning by means of a radiation beam for reading information in the information layer ("reading mode"), writing information in the information layer ("writing mode"), and/or erasing information in the information layer ("erase mode"). "Information density" refers to the amount of stored information per unit area of the information layer. It is determined by, inter alia, the size of the scanning spot formed by the scanning device on the information layer to be scanned. The information density may be increased by decreasing the size of the scanning spot. Since the size of the spot depends, inter alia, on the wavelength λ and the numerical aperture NA of the radiation beam forming the spot. The size of the scanning spot can be decreased by increasing NA and/or by decreasing λ.

"First operating mode" refers to an operating mode of the optical scanning device for scanning the first information layer by means of the first radiation beam. The first radiation beam has one or more predetermined characteristics representative of the first mode, such as, inter alia, a wavelength $\lambda_1$, a polarization $p_1$, an angle of incidence $i_1$ and/or a temperature $T_1$. "Second operating mode" refers to an operating mode of the optical scanning device for scanning the second information layer by means of the second radiation beam. The second radiation beam has one or more predetermined characteristics representative of the second mode, such as, inter alia, a wavelength $\lambda_2$, a polarization $p_2$, an angle of incidence $i_2$ and/or a temperature $T_2$, where the wavelengths $\lambda_1$ and $\lambda_2$, the polarizations $p_1$ and $p_2$, the angles of incidence $i_1$ and $i_2$, and/or the temperatures $T_1$ and $T_2$ differ from each other. In other words, each operating mode may be characterized from another mode by means of at least one parameter having a first predetermined value for that mode and a second, different value for the other mode(s).

A radiation beam propagating along an optical path has a wavefront W with a predetermined shape, given by the following equation:

$$\frac{W}{\lambda} = \frac{\Phi}{2\pi} \tag{0a}$$

where "λ" and "Φ" are the wavelength and the phase of the radiation beam, respectively.

"Wavefront aberration" refers to the following. A first optical element with an optical axis, e.g. an objective lens, for transforming an object to an image may deteriorate the image by introducing the "wavefront aberration" $W_{abb}$. Wavefront aberrations have different types expressed in the form of the so-called Zernike polynomials with different orders. Wavefront tilt or distortion is an example of a wavefront aberration of the first order. Astigmatism and curvature of field and defocus are two examples of a wavefront aberration of the second order. Coma is an example of a wavefront aberration of the third order. Spherical aberration is an example of a wavefront aberration of the fourth order. For more information on the mathematical functions representing the aforementioned wavefront aberrations, see, e.g. the book by M. Born and E. Wolf entitled "Principles of Optics," pp. 464–470 (Pergamon Press $6^{th}$ Ed.) (ISBN 0-08-026482-4).

A "wavefront modification" refers to the following. A second optical element with an optical axis, e.g. a non-periodic phase structure, may be arranged in the optical path of the radiation beam for introducing a "wavefront modification" ΔW in the radiation beam. The wavefront modification ΔW is a modification of the shape of the wavefront W. Like the wavefront aberration, the wavefront modification may be symmetric or asymmetric, of a first, second, etc. order of a radius in the cross-section of the radiation beam if the mathematical function describing the wavefront modification ΔW has a radial order of three, four, etc., respectively. The wavefront modification ΔW may also be "flat"; this means that the second optical element introduces in the radiation beam introduces a constant phase change so that, after taking modulo 2π of the wavefront modification ΔW, the resulting wavefront is constant. The term "flat" does not necessarily imply that the wavefront W exhibits a zero phase change. Furthermore, it can be derived from Equation (0a) that the wavefront modification ΔW may be expressed in the form of a phase change ΔΦ of the radiation beam, given by the following equation:

$$\Delta\Phi = \frac{2\pi}{\lambda}\Delta W \tag{0b}$$

"OPD" of a wavefront aberration $W_{abb}$ or of a wavefront modification ΔW refers to the Optical Path Difference of the wavefront aberration or modification. The root-mean-square value $OPD_{rms}$ of the optical path difference OPD is given by the following equation:

$$OPD_{rms} = \sqrt{\frac{\iint f(r,\theta)^2 r dr}{\iint r dr d\theta} - \left(\frac{\iint f(r,\theta) r dr d\theta}{\iint r dr d\theta}\right)^2} \tag{0c}$$

where "f" is the mathematical function which describes the wavefront aberration $W_{abb}$ or the wavefront modification ΔW and "r" and "θ" are the polar coordinates of the polar coordinate system (r, θ) in a plane normal to the optical axis, with the origin of the system is the point of intersection of that plane and the optical axis and extending over the entrance pupil of the corresponding optical element.

Two values $OPD_{rms,1}$ and $OPD_{rms,2}$ are "substantially equal" to each other where $|OPD_{rms,1} - OPD_{rms,2}|$ is less than or equal to, preferably, 30 mλ, where the value 30 mλ has been chosen arbitrarily. Also, two values of phase changes $\Delta\Phi_a$ and $\Delta\Phi_b$ are "substantially equal" to each other where the respective values $OPD_{rms,1}$ and $OPD_{rms,2}$ are "substantially equal" to each other (the relationship between $\Delta\Phi$ and $\Delta W$ being given in Equation (0b)). Similarly, two values $OPD_{rms,1}$ and $OPD_{rms,2}$ (or two values of phase changes $\Delta\Phi_a$ and $\Delta\Phi_b$) are "substantially different" from each other where $|OPD_{rms,1}-OPD_{rms,2}|$ is more than or equal to, preferably, 30 m$\lambda$.

A "symmetric" wavefront aberration or modification refers to a wavefront aberration or modification that is rotationally symmetric over $2\pi$ with respect an optical axis. For instance, defocus and spherical aberration are symmetric aberrations.

Figure 1A:
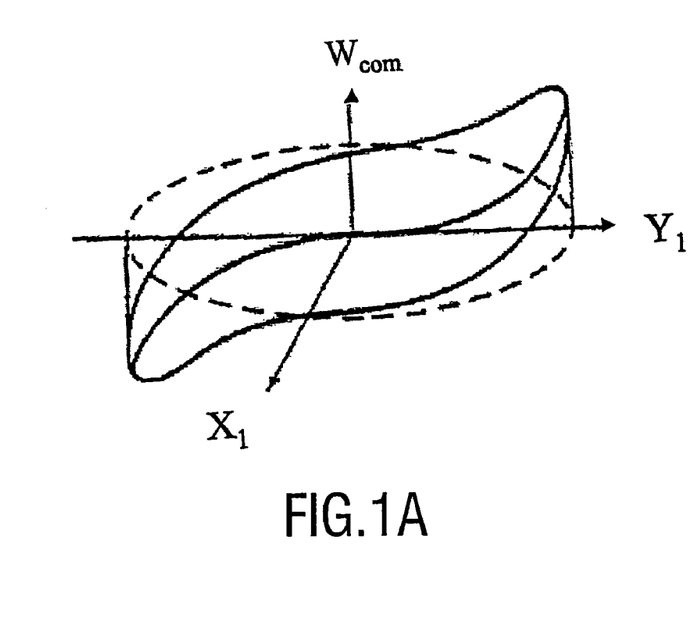
FIGS. 1A and 1B show the shapes of a comatic wavefront modification and an astigmatic wavefront modification, respectively.
Figure 1B:
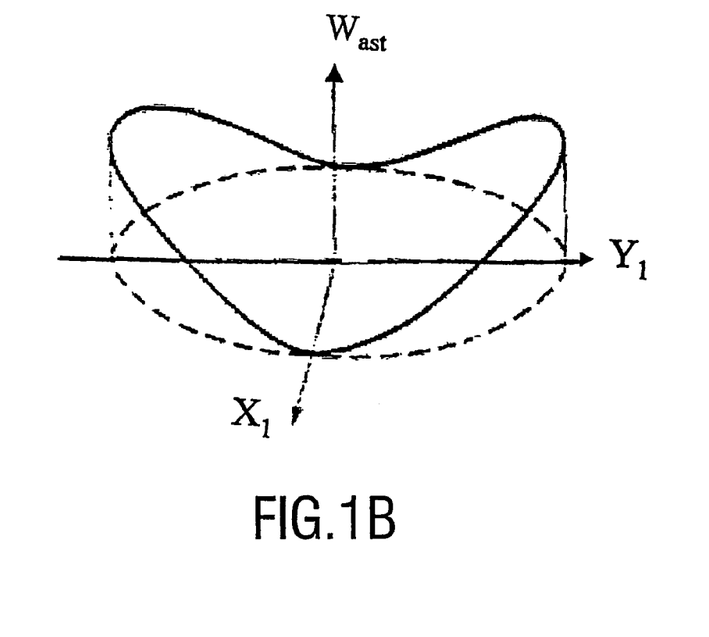

An "asymmetric" wavefront aberration or modification refers to a wavefront aberration or modification that is not a symmetric aberration or modification as defined above. For instance, tilt, astigmatism and coma are asymmetric aberrations. By way of illustration only, FIG. 1A shows the shape of a comatic wavefront modification or aberration $\Delta W_{com}$ in a coordinate system $(X_1, Y_1)$ and FIG. 1B show athe shape an astigmatic wavefront modification or aberration $\Delta W_{ast}$ in the same coordinate system. As shown in FIG. 1A, the wavefront modification or aberration $\Delta W_{com}$ includes a first term "cos $\theta$" for introducing coma. As shown in FIG. 1B, the wavefront modification or aberration $\Delta W_{ast}$ includes a second term "cos $2\theta$" for introducing astigmatism. It is noted in FIGS. 1A and 1B that the asymmetric modifications or aberrations $\Delta W_{com}$ and $\Delta W_{ast}$ are not rotationally symmetric with respect to the normal to the XY-plane.

There is currently a need in the field of optical storage for providing optical scanning devices for scanning optical records carriers by means of radiation beams, where the devices are capable of compensating wavefront aberrations arising in the optical path of the radiation beams.

It has previously been proposed in, for example, the European Patent application filed on 22.07.2002 with the application number EP 02077992.2, to provide an optical scanning device with a non-periodic phase structure (NPS) suitable for generating symmetric wavefront modifications. More specifically, the known scanning device is used for scanning a first information layer by means of a first radiation beam in a first operating mode and a second information layer by means of a second radiation beam in a second operating mode. The known device comprises: a radiation source for emitting the two radiation beams consecutively or simultaneously, an objective lens system for converging the first and second radiation beams on the positions of the first and second information layers, respectively, and the NPS arranged in the optical path of the first and second radiation beams. The known NPS has an optical axis and includes a "central part", i.e. a part which is arranged in an area centered on the optical axis, and a "marginal part", i.e. a part which is arranged in an annular area around the central part. The central and marginal parts of the known NPS form a non-periodic stepped profile in the radial direction.

A drawback of the known optical scanning device provided with such an NPS is that it does not to introduce asymmetric wavefront modifications such as astigmatism, tilt, coma and clover. This is particularly disadvantageous in the case where, e.g., the device is used for scanning two optical record carriers having two different formats, wherein the objective lens includes birefringent material for correcting spherical aberration arising in the radiation beam when scanning one of the two carriers. During scanning of the other carrier, the birefringent objective lens introduces astigmatism when the radiation beam does not propagate along the optic axis of the birefringent material. Such an asymmetric aberration cannot be corrected by the known NPS, since the latter can introduce a symmetric wavefront modification but not an asymmetric modification, such as an astigmatic wavefront modification, in the radiation beam.

Accordingly, it is an object to an optical scanning device operating in at least two modes, the device including an NPS for introducing an asymmetric wavefront modification in at least one of the first and second modes.

This object is reached by an optical scanning device as described in the opening paragraph wherein, according to the invention, one of said central and marginal parts is divided into at least a first angular segment and a second angular segment having a first step height and a second, different step height, respectively, for introducing in said first operating mode a first wavefront modification $\Delta W_{2,1,1}$ and a second wavefront modification $\Delta W_{2,2,1}$, respectively, and in said second operating mode a third wavefront modification $\Delta W_{2,1,1}$ and a fourth wavefront modification $\Delta W_{2,2,2}$, respectively, where the difference $(\Delta W_{2,1,2} + \Delta W_{2,2,2}) - (\Delta W_{2,1,1} + \Delta W_{2,2,1})$ is asymmetric.

The first and second angular segments introduce the wavefront modifications $\Delta W_{2,1,2}, \Delta W_{2,2,2}, \Delta W_{2,1,1}$ and $\Delta W_{2,2,1}$ such that the difference between the resulting wavefront modification $\Delta W_{2,1,2} + \Delta W_{2,2,2}$ in the second mode and the resulting wavefront modification $\Delta W_{2,1,1} + \Delta W_{2,2,1}$ in the first mode is not rotational symmetric with respect to the optical axis of the NPS. By contrast, it is noted that the central and marginal parts of the known NPS introduce in both the first mode and the second mode wavefront modifications that are rotational symmetric with respect to the optical axis of that NPS, thereby introducing symmetric wavefront modifications, e.g. spherical aberration and defocus.

Therefore, an advantage of the optical scanning device provided with the phase structure according to the invention is that it introduces an asymmetric wavefront modification in the radiation beam traversing the NPS during the second mode.

It is noted that U.S. Pat. No. 6,185,168B1 describes a phase structure divided into a plurality of angular segments with respect to an optical axis. However, each segment has one stepped profile in the tangential direction so as to form a diffractive part introducing a wavefront modification that is rotationally symmetric with respect to the optical axis.

It is also noted that the known phase structure includes a diffractive part while the phase structure according to the invention includes a non-periodic structure. Non-periodic structures and diffractive parts are different from each other in terms of structures and purposes. Thus, an NPS comprises a plurality of steps having different heights so that the NPS has a non-periodic profile in the radial direction. The latter is designed for forming a wavefront modification from a radiation beam incident to the NPS. By contrast, a diffractive part includes a pattern of pattern elements having each one stepped profile: it has a periodic stepped profile in the radial or tangential direction. It is designed for forming, from a radiation beam incident to the part, a diffracted radiation beam (i.e. a plurality of radiation beams having each a diffraction order "m", i.e. the zeroth order (m=0), the +1$^{st}$-order (m=1), etc., the −1$^{st}$-order (m=−1), etc.) with different transmission efficiencies for different diffraction orders.

Another object of the invention to provide a phase structure suitable for use in an optical scanning device for scanning two information layers by means of two radiation beams in two operating modes, wherein the phase structure introduces an asymmetric wavefront modification in at least one of the first and second operating modes.

This object is reached by a phase structure as described in the opening paragraph wherein, according to the invention, one of said central and marginal parts includes at least a first segment and a second segment having a first step height and a second, different step height, respectively, for introducing in said first operating mode a first wavefront modification $\Delta W_{2,1,1}$ and a second wavefront modification $\Delta W_{2,2,1}$, respectively, and in said second operating mode a third wavefront modification $\Delta W_{2,1,2}$ and a fourth wavefront modification $\Delta W_{2,2,2}$, respectively, where the difference $(\Delta W_{2,1,2}+\Delta W_{2,2,2})-(\Delta W_{2,1,1}+\Delta W_{2,2,1})$ is asymmetric.

In accordance with another aspect of the invention, there is provided for a lens for use in an optical scanning device for scanning a first information layer by means of a first radiation beam in a first operating mode and a second information layer by means of a second radiation beam in a second operating mode, the lens being provided with a phase structure according to the invention.

The objects, advantages and features of the invention will be apparent from the following, more detailed description of the invention, as illustrated in the accompanying drawings, in which.

An optical scanning device according to the invention is suitable for scanning optical record carriers having at least two different types or formats in at least a first operating mode, respectively. In the following "S" is the total number of operating modes for the optical scanning device; it is an integer equal to or higher than 2. Also "s" refers to the s-th operating mode of the device; it is an integer comprised between 1 and S.

Figure 2:
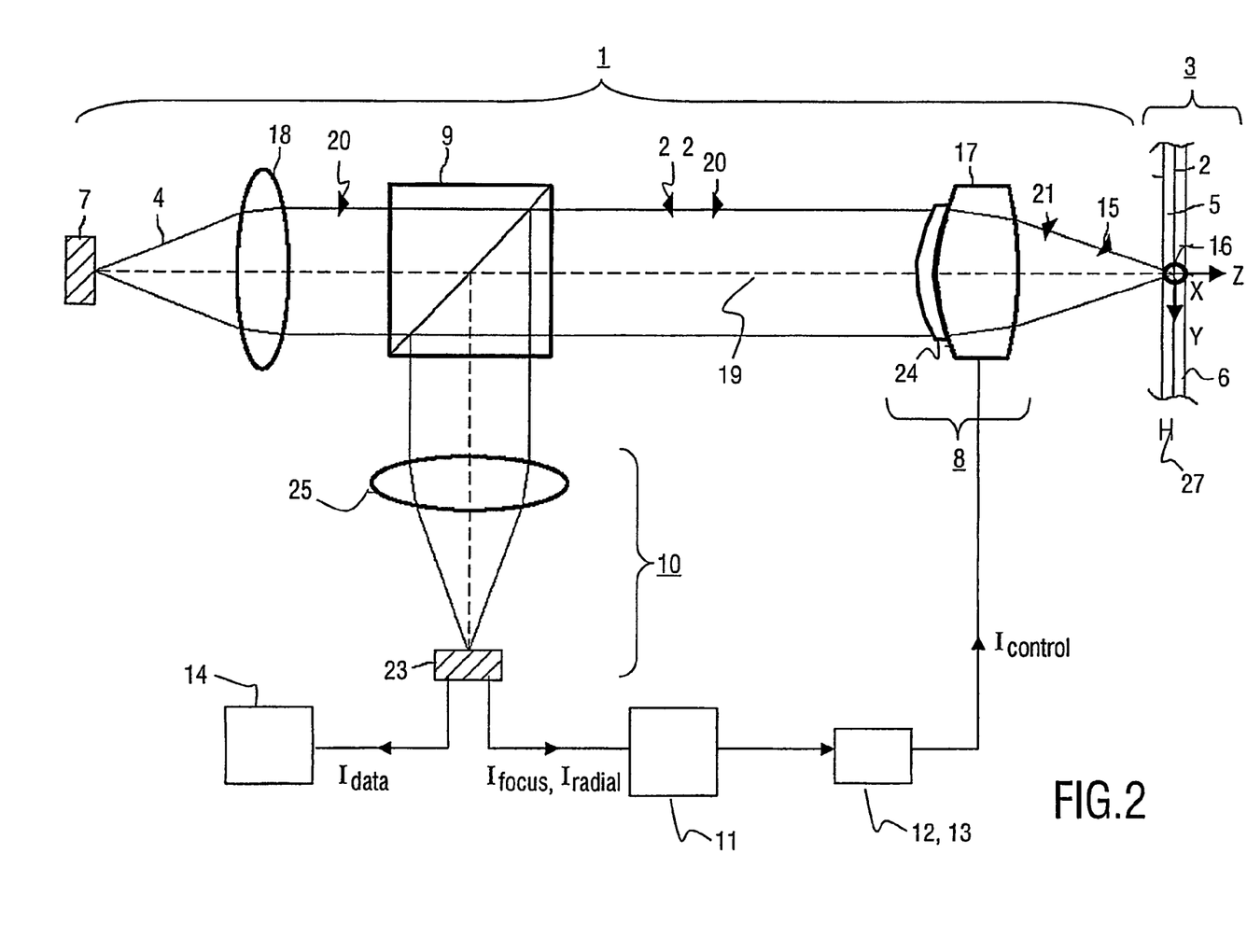
FIG. 2 is a schematic illustration of components of the optical scanning device according to the invention when operating in a first mode.
Figure 3:
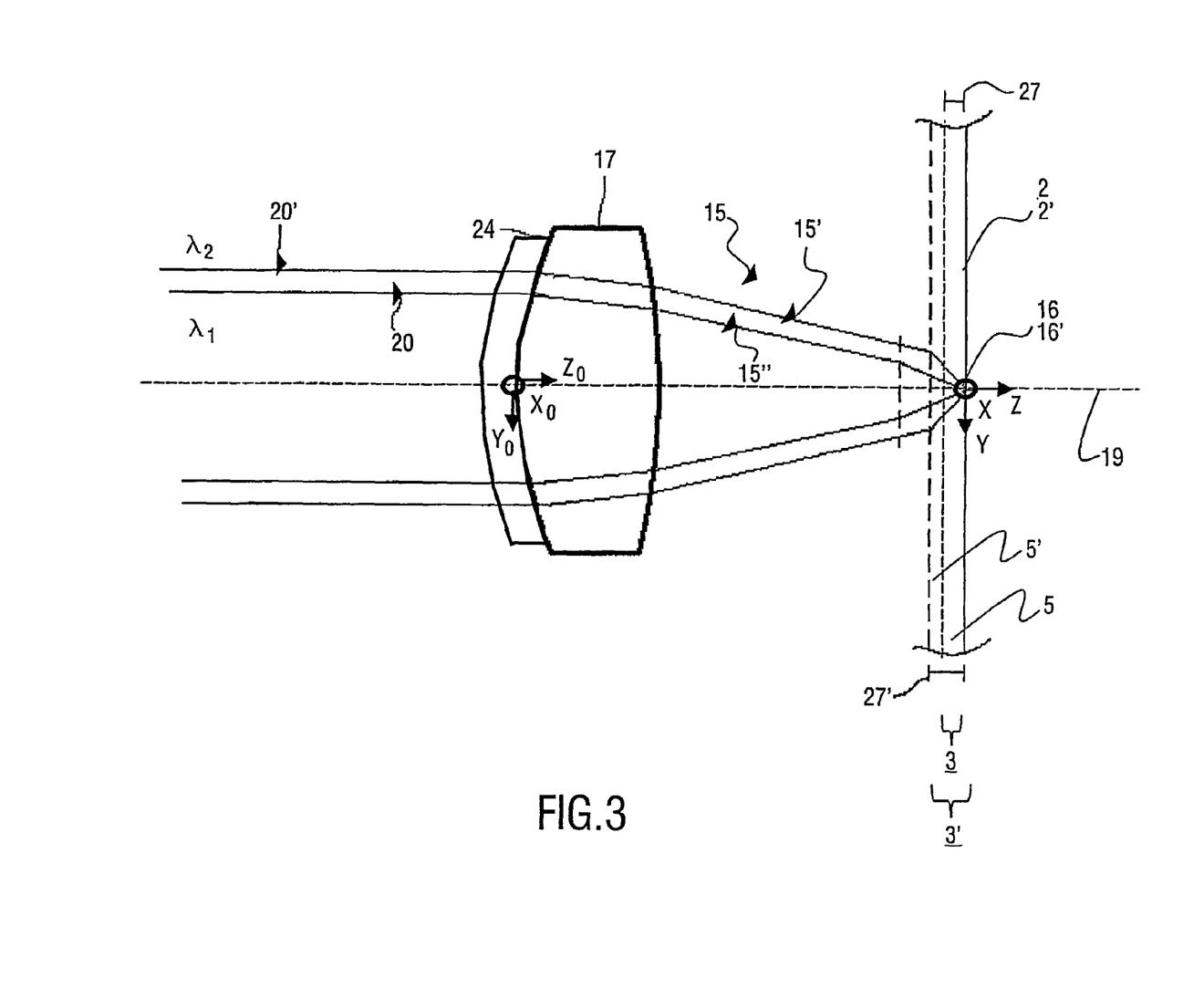
FIG. 3 shows an objective lens for use in the optical scanning device shown in FIG. 2, in the first mode and a second mode.

FIG. 2 is a schematic illustration of components of the optical scanning device according to the invention, designated by the numeral reference 1, when operating in the first mode. FIG. 3 shows an objective lens for use in the optical scanning device 1.

As shown in FIG. 2, the optical scanning device 1 is capable of scanning in the first operating mode (s=1) a first information layer 2 of a first optical record carrier 3 having the first type by means of a first radiation beam 4. It is also capable of scanning in the second operating mode (s=2) a second information layer 2' of a second optical record carrier 3' by means of a second radiation beam 4', as shown in FIG. 3.

By way of illustration, the optical record carrier 3 includes a transparent layer 5 on one side of which the information layer 2 is arranged. The side of the information layer facing away from the transparent layer 5 is protected from environmental influences by a protective layer 6. The transparent layer 5 acts as a substrate for the optical record carrier 3 by providing mechanical support for the information layer 2. Alternatively, the transparent layer 5 may have the sole function of protecting the information layer 2, while the mechanical support is provided by a layer on the other side of the information layer 2, for instance by the protective layer 6 or by an additional information layer and transparent layer connected to the uppermost information layer. It is noted that the information layer has a first information layer depth 27 that corresponds to, in this embodiment as shown in FIG. 2, to the thickness of the transparent layer 5. The information layer 2 is a surface of the carrier 3. That surface contains at least one track, i.e. a path to be followed by the spot of a focused radiation on which path optically-readable marks are arranged to represent information. The marks may be, e.g., in the form of pits or areas with a reflection coefficient or a direction of magnetization different from the surroundings.

Similarly, the optical record carrier 3' includes a second transparent layer 5' on one side of which the information layer 2' is arranged with a second information layer depth 27'.

With reference to both FIGS. 2 and 3, the optical scanning device 1 includes a radiation source 7, a collimator lens 18, a beam splitter 9, an objective lens system 8 having an optical axis 19, a phase structure or non-periodic structure (NPS) 24, and a detection system 10. Furthermore, the optical scanning device 1 includes a servocircuit 11, a focus actuator 12, a radial actuator 13, and an information processing unit 14 for error correction.

In the following "Z-axis" corresponds to the optical axis 19 of the objective lens system 8. In the case where the optical record carriers 3 and 3' have the shape of a disc, the following is defined with respect to a given track: the "radial direction" is the direction of a reference axis, the X-axis, between the track and the center of the disc and the "tangential direction" is the direction of another axis, the Y-axis, that is tangential to the track and perpendicular to the X-axis. In that case (X, Y, Z) is an orthogonal base associated with the position of the information plane 2 and 2'.

The radiation source 7 consecutively or simultaneously supplies the radiation beams 4 and 4'. For example, the radiation source 7 may comprise either a tunable semiconductor laser for consecutively supplying the radiation beams 4 and 4' or two semiconductor lasers for simultaneously supplying these radiation beams. Furthermore, the radiation beams 4 and 4' have the first wavelength $\lambda_1$ and the second, different wavelength $\lambda_2$, respectively.

In the present description that two wavelengths $\lambda_a$ and $\lambda_b$ are substantially different from each other where $|\lambda_a-\lambda_b|$ is equal to or higher than, preferably, 10 nm and, more preferably, 20 nm, where the values 10 and 20 nm are a matter of a purely arbitrary choice.

It is noted that the first and second operating modes are characterized, by way of illustration only, by the wavelengths $\lambda_1$ and $\lambda_2$, respectively, where the wavelengths $\lambda_1$ and $\lambda_2$ substantially differ from each other.

The collimator lens 18 is arranged on the optical axis 19 as shown FIG. 2. In the first mode it transforms the radiation beam 4 into a first substantially collimated beam 20. In the second mode the collimator lens 18 transforms the radiation beam 4' into a second substantially collimated beam 20' (not shown in FIG. 2).

The beam splitter 9 transmits in the first mode the collimated radiation beam 20 toward the objective lens system 8. In the second mode it transmits the collimated radiation beam 20' toward the objective lens system 8 (not shown in FIG. 2). Preferably, the beam splitter 9 is formed with a plane parallel plate that is tilted with an angle α with respect to the Z-axis and, more preferably, α=45°.

The objective lens system 8 transforms in the first mode the collimated radiation beam 20 to a first focused radiation beam 15 having a first numerical aperture $NA_1$ so as to form a first scanning spot 16 in the position of the information layer 2 (as shown in FIGS. 2 and 3). In the second mode the objective lens system 8 transforms the collimated radiation beam 20' to a second focused radiation beam 15' having a second numerical aperture $NA_2$ so as to form a second scanning spot 16' in the position of the information layer 2' (as shown in FIG. 3).

As shown in FIGS. 2 and 3 and by way of illustration only, the objective lens system 8 includes an objective lens 17 provided with the NPS 24 (which will be described in further detail below).

It is noted in FIGS. 2 and 3 that the objective lens 17 is formed as a hybrid lens, i.e. a lens combining the NPS 24 and refractive elements, used in an infinite-conjugate mode. Such a hybrid lens can be formed by applying a stepped profile on the entrance surface of the lens 17, for example by a lithographic process using the photopolymerisation of, e.g., an UV curing lacquer, thereby advantageously resulting in the NPS 24 to be easy to make. Alternatively, the objective lens 17 can be made by diamond turning.

It is also noted in FIGS. 2 and 3 that the objective lens 17 is formed as a convex-convex lens; however, other lens element types such as plano-convex or convex-concave lenses can be used. Furthermore, the objective lens 17 is a single lens. Alternatively, the objective lens 17 may be a compound lens containing two or more lens element.

During scanning in the first mode, the record carrier 3 rotates on a spindle (not shown in FIGS. 2 and 3) and the information layer 2 is then scanned through the transparent layer 5. The focused radiation beam 15 reflects on the information layer 2, thereby forming a reflected beam 21 which returns on the optical path of the forward converging beam 15. The objective lens system 8 transforms the reflected radiation beam 21 to a reflected collimated radiation beam 22. The beam splitter 9 separates the forward radiation beam 20 from the reflected radiation beam 22 by transmitting at least a part of the reflected radiation beam 22 towards the detection system 10. During scanning in the second mode, the record carrier 3' rotates on a spindle (not shown in FIG. 3) and the information layer 2' is then scanned through the transparent layer 5'. The focused radiation beam 15' reflects on the information layer 2', thereby forming a reflected beam 21' which returns on the optical path of the forward converging beam 15'. The objective lens system 8 transforms the reflected radiation beam 21' to a reflected collimated radiation beam 22'. The beam splitter 9 separates the forward radiation beam 20' from the reflected radiation beam 22' by transmitting at least a part of the reflected radiation beam 22' towards the detection system 10.

The detection system 6 includes a convergent lens 25 and a quadrant detector 23 for capturing, in the first mode, said part of the reflected radiation beam 22 and, in the second mode, said part of the reflected radiation beam 22'. The quadrant detector 23 converts, in the first mode, the part of the reflected radiation beam 22 and, in the second mode, the part of the reflected radiation beam 22, to one or more electrical signals. One of the signals is an information signal $I_{data}$, the value of which represents, in the first mode, the information scanned on the information layer 2 and, in the second mode, the information scanned on the information layer 2'. The information signal $I_{data}$ is processed by the information processing unit 14 for error correction. Other signals from the detection system 10 are a focus error signal $I_{focus}$ and a radial tracking error signal $I_{radial}$. The signal $I_{focus}$ represents, in the first mode, the axial difference in height along the Z-axis between the scanning spot 16 and the position of the information layer 2 and, in the second mode, the axial difference in height along the Z-axis between the scanning spot 16' and the position of the information layer 2'. Preferably, the signal $I_{focus}$ is formed by the "astigmatic method" which is known from, inter alia, the book by G. Bouwhuis, J. Braat, A. Huijser et al, entitled "Principles of Optical Disc Systems," pp. 75–80 (Adam Hilger 1985) (ISBN 0-85274-785-3). The radial tracking error signal $I_{radial}$ represents, in the first mode, the distance in the XY-plane of the information layer 2 between the scanning spot 16 and the center of a track in the information layer 2 to be followed by the scanning spot 16 and, in the second mode, the distance in the XY-plane of the information layer 2' between the scanning spot 16' and the center of a track in the information layer 2' to be followed by the scanning spot 16'. Preferably, the signal $I_{radial}$ is formed from the "radial push-pull method" which is known from, inter alia, the book by G. Bouwhuis, pp. 70–73.

The servocircuit 11 is arranged for, in response to the signals $I_{focus}$ and $I_{radial}$, providing servo control signals $I_{control}$ for controlling the focus actuator 12 and the radial actuator 13, respectively. The focus actuator 12 controls the position of the objective lens 17 along the Z-axis, thereby controlling, in the first mode, the position of the scanning spot 16 such that it coincides substantially with the plane of the information layer 2 and, in the second mode, the position of the scanning spot 16' such that it coincides substantially with the plane of the information layer 2'. The radial actuator 13 controls the position of the objective lens 17 along the X-axis, thereby controlling, in the fist mode, the radial position of the scanning spot 16 such that it coincides substantially with the center line of the track to be followed in the information layer 2 and, in the second mode, the radial position of the scanning spot 16' such that it coincides substantially with the center line of the track to be followed in the information layer 2'.

The phase structure or NPS 24 according to the invention for use in the optical scanning device 1 operating in the first and second modes is now described in further detail.

In the first embodiment shown in FIGS. 2 and 3, the NPS 24 is arranged on the side of a first objective lens 17 facing the radiation source 7 (referred to herein as the "entrance face"). $(X_o, Y_o, Z_o)$ is an orthogonal base parallel to the base (X, Y, Z) and associated with the entrance surface of the objective lens 17, where the point of origin "O" is the center of the entrance pupil of the lens. As an alternative to that embodiment, the NPS 24 may be arranged on the other surface of the lens 17 (referred to herein as the "exit face"). Also alternatively, the objective lens 17 is, for example, a refractive objective lens element provided with a planar lens element forming the NPS 24. Also alternatively, the NPS 24 is provided on an optical element separate from the objective lens system 8, for example on a beam splitter or a quarter wavelength plate.

The NPS 24 includes a central part Pi and at least one marginal part $P_2$. In the present description a "central part" refers to part centered on an optical axis (the optical axis 19 in the present case) and having an outer boundary and a "marginal part" refers to a part located around such a central part and having an inner boundary and an outer boundary. In the following "M" is the total number of the parts of the NPS 24; it is an integer equal to or higher than 2. "$P_m$" is the mth part of the NPS 24, where "m" is an integer comprised between 1 and M. It is noted that "$P_m$" is central in the case where m=1 and annular in the case where m is equal to or higher than 2.

Furthermore, one of the parts $P_1$ and $P_2$, e.g. the part $P_2$, is divided into at least a first angular segment $AS_{2,1}$ and a second segment $AS_{2,2}$. The first angular segment $AS_{2,1}$ introduces a first wavefront modification $\Delta W_{2,1,1}$ in the radiation beam 15 in the first mode and a second wavefront modification $\Delta W_{2,1,1}$ in the radiation beam 15' in the second mode. The second angular segment $AS_{2,2}$ introduces a third wavefront modification $\Delta W_{2,2,1}$ in the radiation beam 15 in the first mode and a fourth wavefront modification $\Delta W_{2,2,2}$ in the radiation beam 15' in the second mode. It is noted that the part $P_2$ introduces the resulting wavefront modification $(\Delta W_{2,1,1} + \Delta W_{2,2,1})$ in the radiation beam 15 in the first mode and the resulting wavefront modification $(\Delta W_{2,1,2} + \Delta W_{2,2,2})$ in the radiation beam 15' in the second mode. Additionally, the wavefront modifications $\Delta W_{2,1,1}$, $\Delta W_{2,1,2}$, $\Delta W_{2,2,1}$ and $\Delta W_{2,2,2}$ are such that the difference $(\Delta W_{2,1,2} + \Delta W_{2,2,2}) - (\Delta W_{2,1,1} + \Delta W_{2,2,1})$ between the resulting wavefront modifications $(\Delta W_{2,1,2} + \Delta W_{2,2,2})$ and $(\Delta W_{2,1,1} + \Delta W_{2,2,1})$ in the second and first modes is asymmetric, i.e. is not rotationally symmetric over $2\pi$ with respect to the optical axis 19.

In the following "$J_m$" is the total number of angular segments for the part $P_m$; it is an integer equal to or higher than 2. "$AS_{m,j}$" is the jth angular segment of the part $P_m$ where "j" is an integer comprised between 1 and $J_m$. "$h_{m,j}$" is the step height of the jth angular segment of the part $P_m$. "$\Delta W_{m,j,s}$" is the wavefront modification introduced by the angular segment $AS_{m,j}$ in the s-th operating mode of the optical scanning device. "$\Delta \Phi_{m,j,s}$" is the phase change associated with the wavefront modification $\Delta W_{m,j,s}$ according to Equation (0a). It is noted that the wavefront modification $\Delta W_{m,j,s}$ in the s-th mode is substantially constant for any point of the wavefront. It is also noted that the angular segment $AS_{m,j}$ having the step height $h_{m,j}$ introduces the phase change $\Delta \Phi_{m,j,s}$ in the s-th operating mode as follows:

$$\Delta \Phi_{m,j,s} = \frac{2\pi}{\lambda_s}(n - n_o)h_{m,j} \quad (2b)$$

where "$\lambda_s$" is the wavelength of the radiation beam traversing the NPS 24 in the s-th mode and "$n_o$" is the refractive index of the adjacent medium that is, in the following and by way of illustration only, air, i.e. $n_0=1$.

As an improvement of the NPS 24 described above, the step heights $h_{m,j}$ are chosen so that the NPS 24 introduces substantially flat wavefront modifications in one of the first and second mode, e.g. in the first mode. In the following the wavelength $\lambda_1$ of the radiation beam 15 in the first mode refers to as the design wavelength $\lambda_{ref}$. Consequently, the step heights $h_{m,j}$ are chosen so that both the wavefront modifications $\Delta W_{1,1,1}$ and $\Delta W_{1,2,1}$ in the first mode are substantially flat (or the differences between phase changes $\Delta \Phi_{m,j,1}$ in the first mode are substantially equal to different multiples of $2\pi$, i.e. to zero modulo $2\pi$) and the resulting wavefront modification $(\Delta W_{1,1,2} + \Delta W_{1,2,2})$ in the second mode is asymmetric.

In other words, the step heights $h_{m,j}$ are chosen to be multiples of a reference height $h_{ref}$:

$$h_{m,j} = q_{m,j} h_{ref} \quad (3a)$$

where "$q_{m,j}$" is an integer and the reference height $h_{ref}$ is defined as follows:

$$h_{ref} = \frac{\lambda_{ref}}{n - n_0} = \frac{\lambda_1}{n - 1} \quad (3b)$$

where "n" is the refractive index of the NPS 24. It is noted that the optical path of the radiation beam traversing the NPS 24 depends on the angle of incidence of the beam entering the NPS 24 with respect to the normal to the entrance pupil of the objective lens 17. Also, since the step height $h_{m,j}$ is a multiple of the reference height $h_{ref}$, the optical path of the radiation beam traversing the NPS 24 depend on the refractive index n according to Equation (3b) which in turn depends on the temperature and the wavelength of the beam. In other words, the optical path of the radiation beam traversing the NPS 24 in the first mode differs from that in the second mode. Also, it is noted that the reference height $h_{ref}$ is substantially constant, in the case where the NPS 24 is provided on a plane surface (e.g. on a plane parallel plate). Furthermore, in the case where the NPS 24 is provided on a curved surface (e.g. that of a lens), the NPS 24 may be adjusted over the length of the step such that the phase changes $\Delta \Phi_{m,j,s}$ are substantially equally to multiple of $2\pi$, i.e. such that the curvature of the wavefront of the radiation beam entering the objective lens 17 equals the curvature of the entrance surface of that lens.

Figure 4:
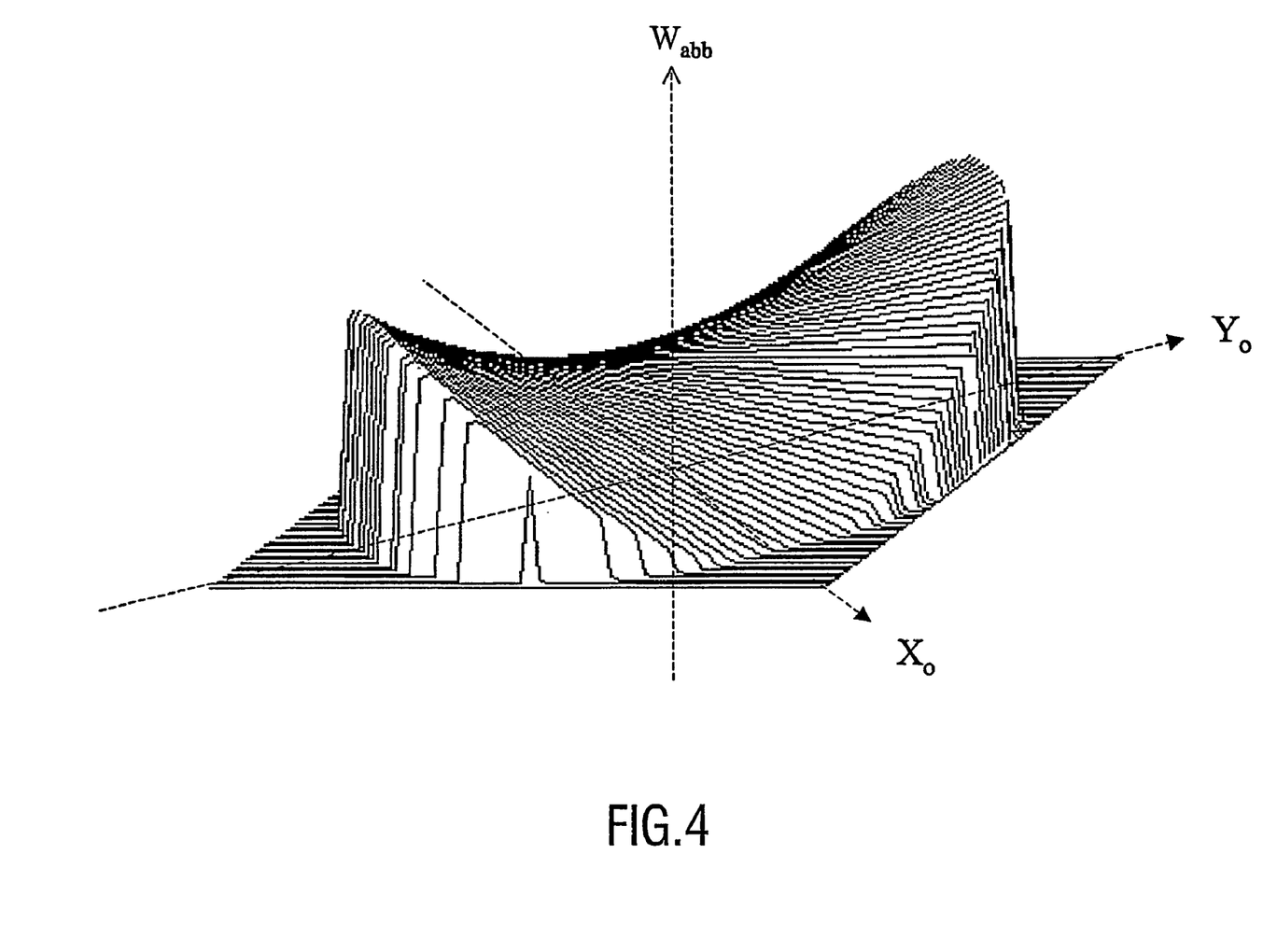
FIG. 4 shows a curve representing an astigmatic aberration generated by the objective lens shown in FIG. 3.

A more specific embodiment of the improved NPS 24 is now described in the case where the radiation beam 20 has a first polarization $p_1$ in the first mode, the radiation beam 20' has a second, different polarization $p_2$ in the second mode, and the objective lens 17 includes birefringent material sensitive to the polarizations $p_1$ and $p_2$. In the following "$r_o$" is the pupil radius of the face of the objective lens 17, which is provided with the NPS 24. Furthermore, the objective lens 17 is aligned such that the refractive index of the lens equals $n_e$ in the case where the polarization $p_1$ or $p_2$ equals $p_e$ and $n_o$ in the case where the polarization $p_1$ or $p_2$ equals $p_o$, where "$n_e$" and "$n_o$" are the extraordinary and ordinary refractive indices of the birefringent material. Also, the objective lens 17 introduces no aberration in the first mode and an astigmatic aberration $W_{abb}$ in the second mode when the radiation beam does not propagate along the optic axis of the birefringent material. FIG. 4 shows a curve 81 representing the astigmatic aberration $W_{abb}$ in the coordinate system ($X_o$, $Y_o$). In the following and by way of illustration only the value $OPD_{rms}$ of the aberration $W_{abb}$ equals 61 m$\lambda$.

In respect of the first mode the step heights $h_{m,j}$ are chosen so that the wavefront modifications $\Delta W_{m,j,s}$ are substantially flat. Thus, the step heights $h_{m,j}$ are to equal different multiples $q_{m,j}$ of the reference height $h_{ref}$. By way of illustration only, in the case where the birefringent material is the quartz with $n_o=1.54$ and $n_e=1.55$, the wavelength $\lambda_1$ (i.e. the design wavelength) is equal to 405 nm and the polarization $p_1$ equals $p_o$, it is known from Equation (3b) that $h_{ref}=0.751$ μm.

In respect of the second mode and in the case where $p_2=p_e$, $n_e=1.55$ and $\lambda_2=405$ nm, the step heights $h_{m,j}$ that equals $q_{m,j}h_{ref}$ introduce the phase changes $\Delta\Phi_{m,j,2}$ that differs from zero modulo $2\pi$. Table I shows the values of the phase changes $\Delta\Phi_{m,j,2}$ modulo $2\pi$ in the second mode for different values of the integers $q_{m,j}$.

TABLE I

| $q_{m,j}$ | $\Delta\Phi_{m,j,2}$ (modulo $2\pi$) |
|---|---|
| 1 | 0.1160 |
| 2 | 0.2321 |
| 3 | 0.3481 |
| 4 | 0.4642 |
| 5 | 0.5802 |
| 6 | 0.6962 |

It is noted in Table I that the phase changes $\Delta\Phi_{m,j,2}$ are substantially equal to a limited number of different values of phase change modulo $2\pi$. This limited number may be calculated based on the theory of Continued Fractions, as known from, e.g., the European patent application filed on 05.04.2001 under the application number 01201255.5.

The integers $q_{m,j}$ are chosen so that the NPS 24 compensates the astigmatic wavefront aberration $W_{ast}$, i.e. so that the sum of the resulting wavefront modification $$\sum_{m=1}^{M}\sum_{j=1}^{J_m}\Delta W_{m,j,2}$$

and the astigmatic wavefront aberration $W_{abb}$ substantially equals zero. Consequently, for reasons of symmetry, the NPS 24 includes three parts, the central part $P_1$, the marginal $P_2$ and another marginal part $P_3$ (M=3). The part $P_1$ includes one angular segment $AS_{1,1}$ ($J_1$=1), the part $P_2$ includes four angular segments $AS_{2,1}$ $AS_{2,2}$ $AS_{2,4}$ ($J_2$=4) and the part $P_3$ includes four angular segments $AS_{3,1}$ $AS_{3,2}$, $AS_{3,3}$ and $AS_{3,4}$ ($J_3$=4).

Each of the angular segments $AS_{m,j}$ is defined by a minimum radius $r_{min}(AS_{m,j})$, a maximum radius $r_{max}(AS_{m,j})$, a minimum angle $\theta_{min}(AS_{m,j})$ and a maximum angle $\theta_{max}(AS_{m,j})$. It is noted in respect of that improved embodiment of the NPS 24 that the angular segments $AS_{m,j}$ are rotationally symmetric with respect to the $Z_o$-axis (i.e. the optical axis of the objective lens 17) over the range of angles comprised between the minimum and maximum angles $\theta_{min}(AS_{m,j})$ and $\theta_{max}(AS_{m,j})$. Table II shows the "optimized zones" of the angular segments $AS_{m,j}$, i.e. the radii $r_{min}(AS_{m,j})$ and $r_{max}(AS_{m,j})$ and the angles $\theta_{min}(AS_{m,j})$ and $\theta_{max}(AS_{m,j})$. Also Table II refers to the case where $p_1=p_o$ and the phase changes $\Delta\Phi_{m,j,2}$ given in Table I and the wavefront aberration $W_{abb}$ (see FIG. 4) according to the method known, e.g., from the article by B. H. W. Hendriks, J. E. de Vries and H. P. Urbach, "Application of non-periodic phase structures in optical systems", Appl. Opt. 40 (2001) pp. 6548–6560, which describes how to make a objective lens suitable for scanning DVD-format discs and CD-format discs with the aid of an NPS.

TABLE II

| Parts $P_m$ | Angular segments $AS_{m,j}$ | $r_{min}/r_o$ | $r_{max}/r_o$ | $\theta_{min}$ [°] | $\theta_{max}$ [°] |
|---|---|---|---|---|---|
| $P_1$ | $AS_{1,1}$ | 0 | 0.333 | −45 | +315 |
| $P_2$ | $AS_{2,1}$ | 0.333 | 0.733 | −45 | +45 |

TABLE II-continued

| Parts $P_m$ | Angular segments $AS_{m,j}$ | $r_{min}/r_o$ | $r_{max}/r_o$ | $\theta_{min}$ [°] | $\theta_{max}$ [°] |
|---|---|---|---|---|---|
|  | $AS_{2,2}$ | 0.333 | 0.733 | +45 | +135 |
|  | $AS_{2,3}$ | 0.333 | 0.733 | +135 | +225 |
|  | $AS_{2,4}$ | 0.333 | 0.733 | +225 | +315 |
| $P_3$ | $AS_{3,1}$ | 0.733 | 1 | −45 | +45 |
|  | $AS_{3,2}$ | 0.733 | 1 | +45 | +135 |
|  | $AS_{3,3}$ | 0.733 | 1 | +135 | +225 |
|  | $AS_{3,4}$ | 0.733 | 1 | +225 | +315 |

Table III shows the step heights $h_{m,j}$ for the angular segments $AS_{m,j}$ as defined in Table II.

TABLE III

| Parts $P_m$ | Angular segments $AS_{m,j}$ | Step heights $h_{m,j}$ [µm] |
|---|---|---|
| $P_1$ | $AS_{1,1}$ | 0 |
| $P_2$ | $AS_{2,1}$ | −1.50 |
|  | $AS_{2,2}$ | 1.50 |
|  | $AS_{2,3}$ | −1.50 |
|  | $AS_{2,4}$ | 1.50 |
| $P_3$ | $AS_{3,1}$ | −3.75 |
|  | $AS_{3,2}$ | 3.75 |
|  | $AS_{3,3}$ | −3.75 |
|  | $AS_{3,4}$ | 3.75 |

It is noted in Table III that some step heights have negative values, e.g. in respect of the angular segment $AS_{2,1}$. In the present description a negative value of a step height indicates a depression, instead of a rise, in the body having the non-periodic stepped profile, here the objective lens 17.

For further detail, see the European patent application EP 1,179,212-A that describes a negative step height of a plate.

Figure 5A:
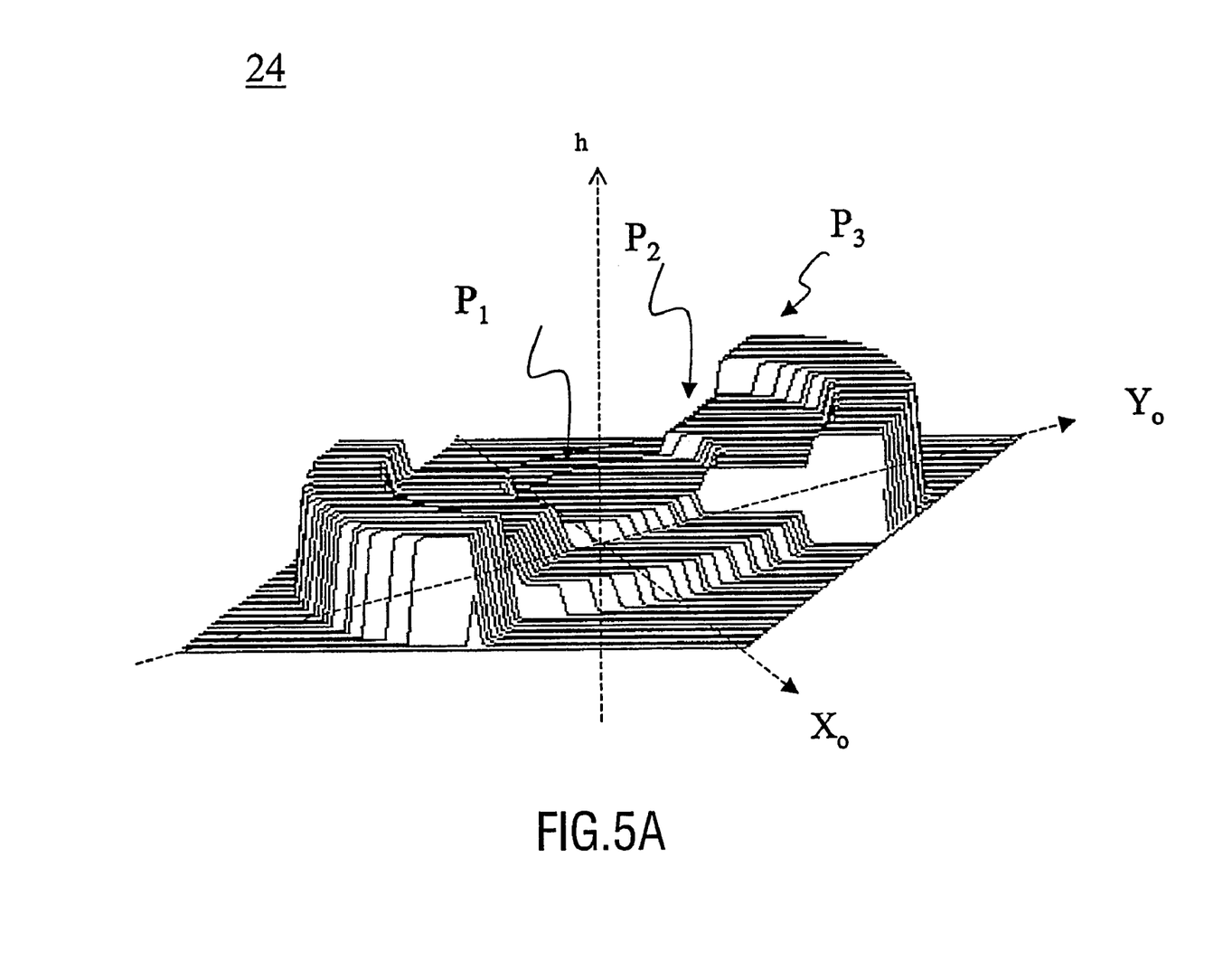
FIG. 5A shows a perspective view of the phase structure according to the invention for compensating the astigmatic aberration shown in FIG. 4.
Figure 5B:
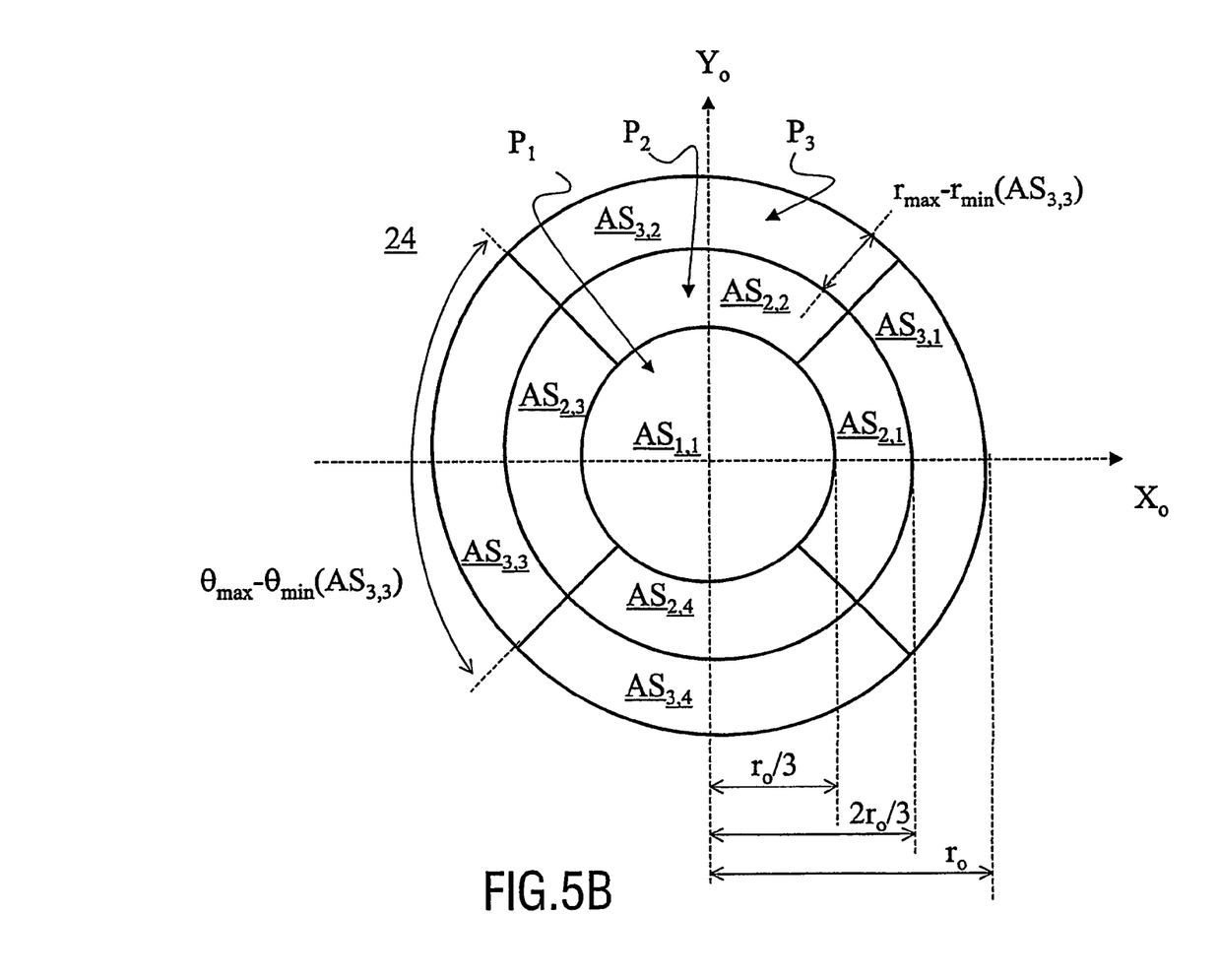
FIG. 5B shows a front view of the phase structure shown in FIG. 4.

FIG. 5A shows a perspective view of the NPS 24 designed according to Table III. FIG. 5B shows a front view of that NPS viewed from the side of the entrance pupil of the objective lens 17. It is noted in FIG. 5B that the angular segments are arranged according to a quadrant-arrangement where the dividing lines between the angular segments $AS_{2,j}$ are aligned with those between the angular segments $AS_{3,j}$. It is also noted that the stepped profile of the NPS 24 is designed such that the relative step heights $h_{m,j+1}-h_{m,j}$ or $h_{m+1,j}-h_{m,j}$ between adjacent angular segments $S_{m,j+1}$ and $S_{m,j}$ or $S_{m+1,j}$ and $S_{m,j}$, respectively, include a relative step height having an optical path substantially equal to $a\lambda_1$, wherein "a" is an integer and a>1 and "$\lambda_1$" is the design wavelength. In other words, such a relative step height is higher than the reference height $h_{ref}$.

Figure 6:
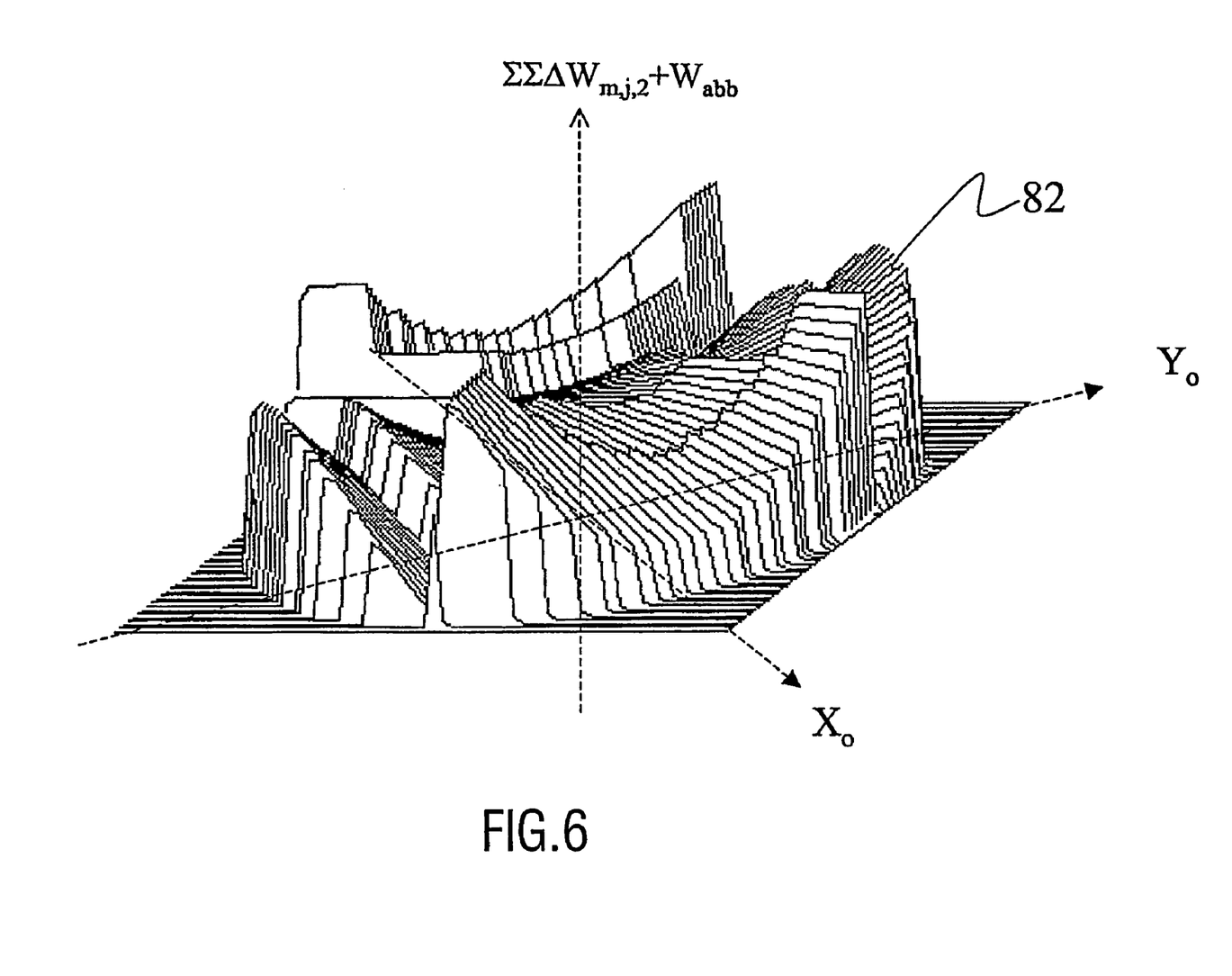
FIG. 6 shows a surface representing the sum of the wavefront aberration shown in FIG. 4 and of the wavefront modification introduced by the phase structure shown in FIGS. 5A and 5B.

FIG. 6 shows a surface 82 representing the sum $$\sum_{m=1}^{3}\sum_{j=1}^{J_m}\Delta W_{m,j,2} + W_{abb}$$

of the wavefront aberration $W_{abb}$ shown in FIG. 4 and the wavefront modification $$\sum_{m=1}^{3}\sum_{j=1}^{J_m}\Delta W_{m,j,2}$$

introduced by the NPS 24 shown in FIGS. 5A and 5B.

Table IV shows the values $$OPD_{rms}[W_{abb}] \text{ and } OPD_{rms}\left[\sum_{m=1}^{M}\sum_{j=1}^{J_m}\Delta W_{m,j,2} + W_{abb}\right]$$

without and with the NPS 24 shown in FIG. 5A for compensating the wavefront aberration $W_{abb}$ shown in FIG. 4, respectively. These values have been calculated from ray-tracing simulations.

TABLE IV

| $OPD_{rms}[W_{abb}]$ | $OPD_{rms}\left[\sum_{m=1}^{M}\sum_{j=1}^{J_M}\Delta W_{m,j,2} + W_{abb}\right]$ |
|---|---|
| 61 mλ | 30 mλ |

It is noted that the NPS 24 shown in FIGS. 5A and 5B compensates approximately 50% of the astigmatic aberration $W_{abb}$ introduced by the birefringent objective lens 17. It is also noted in Table IV that the value $$OPD_{rms}\left[\sum_{m=1}^{M}\sum_{j=1}^{J_M}\Delta W_{m,j,2} + W_{abb}\right]$$

is below the diffraction limit, i.e. less than 70 mλ, for the NPS 24 according to Table IV, thereby allowing any format of optical record carriers to be scanned with a significant improvement in terms of $OPD_{rms}$ with respect to the case where an optical scanning device is not provided with such a NPS.

It is also noted that a birefringent lens such as the lens 17 provided with the NPS 24 as described above forms a lens system for forming infinite conjugate, e.g. for dual layers. One of those two information layers is scanned in the first mode by means of a radiation beam having a predetermined polarization and the other information layer is scanned in the second mode by means of another radiation beam having a different polarization. Thus, while the birefringent lens introduces astigmatism in the second mode and no astigmatism in the first mode, the NPS accordingly compensates such astigmatism in the second mode and is optically inactive in the first mode.

Whilst in the above described embodiment an optical scanning device compatible with a birefringent objective lens is described, it is to be appreciated that the scanning device according to the invention can be alternatively used for any other types of optical record carriers to be scanned. It is noted that the use of a birefringent material is not essential for the invention.

An alternative of the phase structure described above is designed for introduced any asymmetric wavefront modification, e.g. a comatic wavefront modification as shown in FIG. 1A. For more information on the mathematical functions representing such wavefront modifications, see, e.g. the book by M. Born and E. Wolf entitled "Principles of Optics," pp. 464–470 (Pergamon Press 6$^{th}$ Ed.) (ISBN 0-08-026482-4).

Also alternatively, the phase structure may be provided with numbers of parts and angular segments other than those described above. It is noted that the higher the number M and/or the numbers $J_m$ the better the compensation of the aberration $W_{abb}$ introduced by the objective lens. However this would result in increasing the complexity of the NPS especially in terms of manufacturing. Therefore a tradeoff between compensation and manufacturing need be found.

Figure 8A:
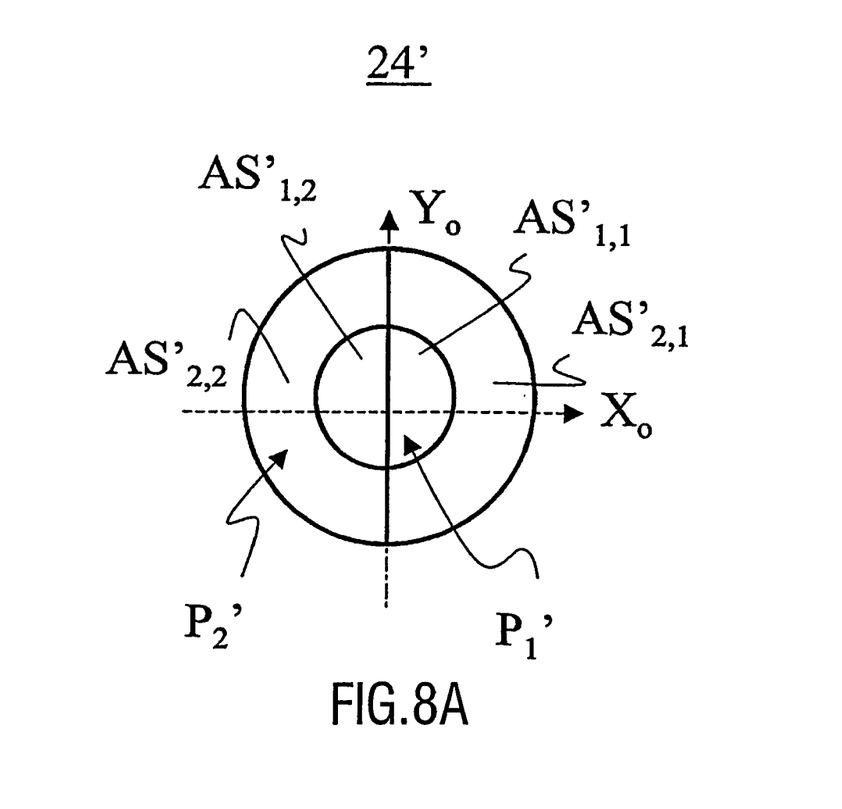
FIGS. 8A and 8B shows two front views of two alternatives of the phase structure shown in FIG. 5B.
Figure 8B:
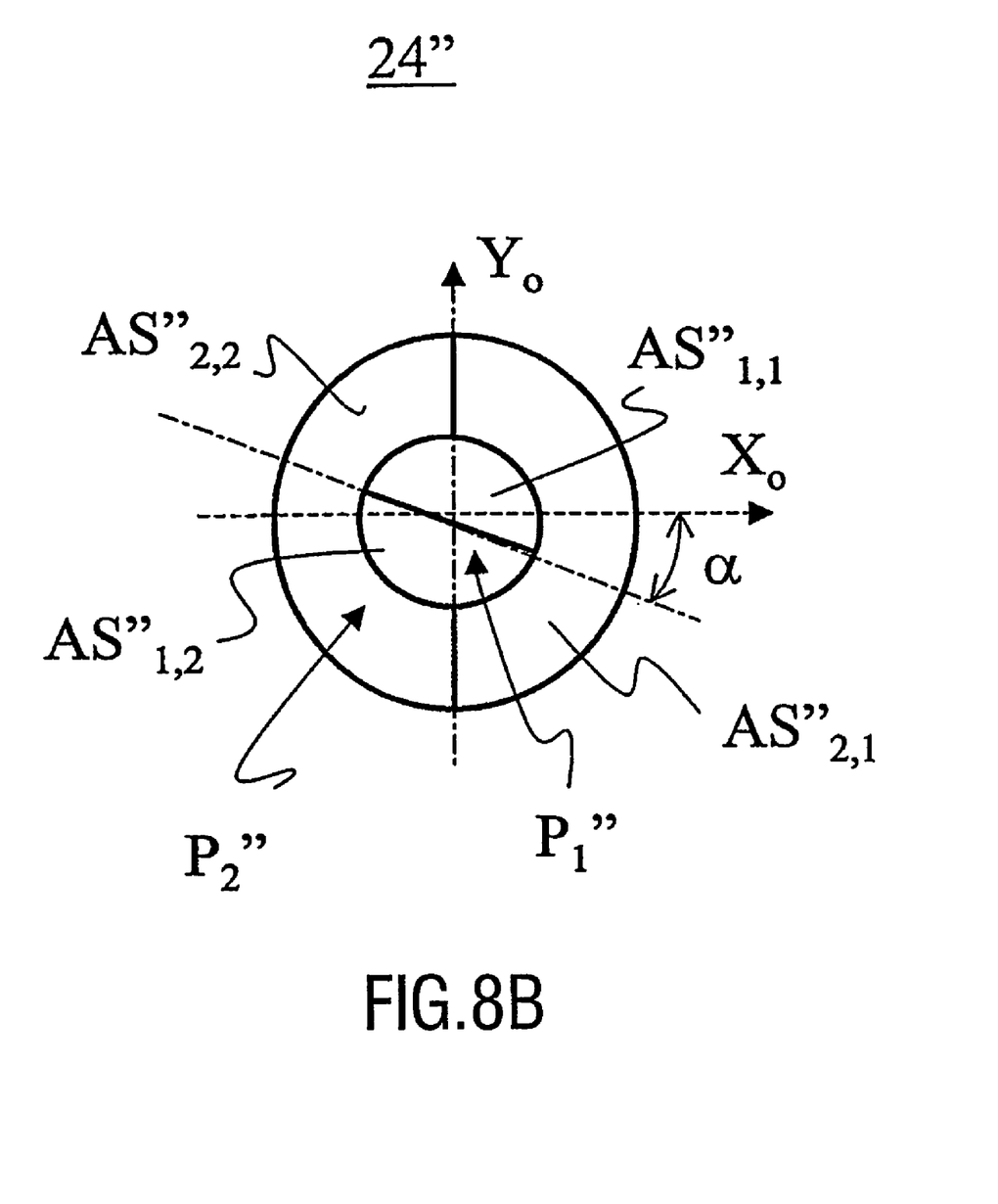

Also alternatively, the angular segments are provided in an arrangement other than the quadrant-arrangement shown in FIG. 5B. FIGS. 8A and 8B shows two front views of two alternatives of the phase structure shown in FIG. 5B. As shown in FIG. 8A the NPS 24' has two parts $P'_1$ and $P'_2$, wherein the part $P'_1$ is divided into two angular segments $AS'_{1,1}$ and $AS'_{1,2}$ and the part $P'_2$ is divided into two angular segments $AS'_{2,1}$ and $AS'_{2,2}$. Similarly, the NPS 24'' shown in FIG. 8B has two parts $P'''_1$ and $P'''_2$, and four angular segments $AS''_{1,1}$, $AS''_{1,2}$, $AS''_{2,1}$ and $AS''_{2,2}$. It is noted that the dividing line between the angular segments $AS'_{1,1}$ and $AS'_{1,2}$ is aligned with the dividing line between the angular segments $AS'_{2,1}$ and $AS'_{2,2}$ while the dividing line between the angular segments $AS''_{1,1}$ and $AS''_{1,2}$ forms a non-zero angle α with the dividing line between the angular segments $AS''_{2,1}$ and $AS''_{2,2}$. In other words, these different possible arrangements of the parts of the NPS allow to introduce any asymmetric wavefront modification in the radiation beam traversing the NPS.

Figure 7:
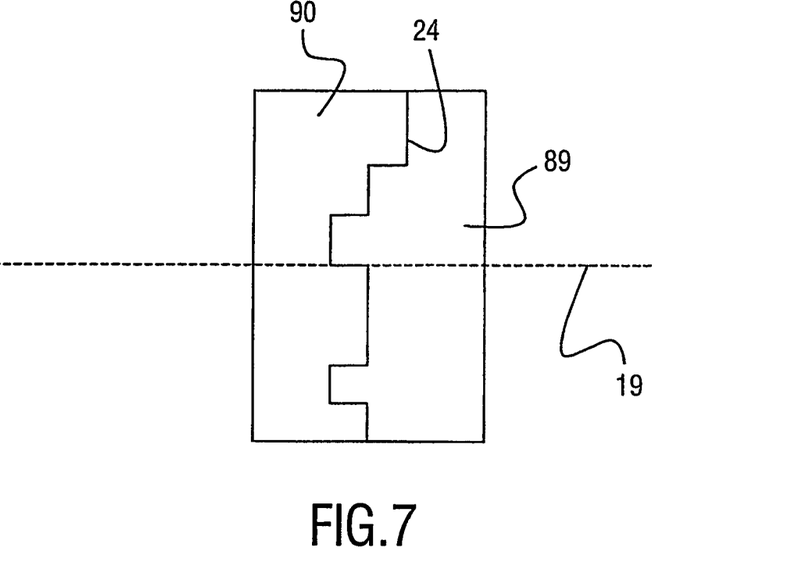
FIG. 7 shows an improvement of the arrangement of the objective lens and phase structure shown in FIG. 3.

Another alternative to the phase structure arranged on the entrance face of the objective lens may be of any shape like a plate. Furthermore, as an improvement of such a plate provided with the NPS according to the invention, a cover layer is arranged on the angular segments such that the phase structure forms a plane plate. FIG. 7 shows such an improvement where a plate 89 including the NPS 24 is provided with a cover layer 90. By way of illustration only, the cover layer 90 is made of an isotropic material having a refractive index that substantially equals the refractive index $n_o$ of the birefringent material of the plate 89. In the present description, two refractive indices $n_a$ and $n_b$ are substantially equal where $|n_a-n_b|$ is equal to or less than, preferably, 0.01 and, more preferably, 0.005, where the values 0.01 and 0.005 are a matter of arbitrary choice. In the first mode the polarization of the radiation beam traversing the improved NPS 24 is such that the refractive index of the NPS 24 equals $n_o$. In that mode the improved NPS 24 has no optical effect on the radiation beam traversing the NPS. In the second mode the polarization of the radiation beam traversing the NPS 24 is such that the refractive index of the NPS 24 equals $n_e$. In that mode there is a mismatch between the refractive indices of the birefringent plate 89 and the isotropic cover layer 90. For generating the phase change $\Delta\Phi_{m,j,2}$ the step height $h_{m,j}$ must equal $h_{m,j}=h_{ref}\Delta\Phi_{m,j,2}/2\pi$, where $h_{ref}=\lambda_{ref}/(n_e-n_o)$. Thus, by way of illustration only and in the case where $n_o=11.5$, $n_e=1.6$ and $\lambda_{ref}=405$ nm, it is found that $h_{ref}=4.05$ μm. By proper design of the various heights $h_{m,j}$ the NPS 24 generates an astigmatic resulting wavefront modification $$\sum_{m=1}^{M}\sum_{j=1}^{J_m}\Delta W_{m,j,2}.$$

Table V shows the step heights $h_{m,j}$ for the angular segments $AS_{m,j}$ as defined in Table II.

TABLE V

| Parts $P_m$ | Angular segments $AS_{m,j}$ | Step heights $h_{m,j}$ [μm] |
|---|---|---|
| $P_1$ | $AS_{1,1}$ | 0 |
| $P_2$ | $AS_{2,1}$ | −0.1218 |
|  | $AS_{2,2}$ | 0.1218 |
|  | $AS_{2,3}$ | −0.1218 |
|  | $AS_{2,4}$ | 0.1218 |
| $P_3$ | $AS_{3,1}$ | −0.3039 |
|  | $AS_{3,2}$ | 0.3039 |
|  | $AS_{3,3}$ | −0.3039 |
|  | $AS_{3,4}$ | 0.3039 |

Table VI shows the values $$OPD_{rms}[W_{abb}] \text{ and } OPD_{rms}\left[\sum_{m=1}^{M}\sum_{j=1}^{J_M} \Delta W_{m,j,2} + W_{abb}\right]$$

without and with the NPS 24 as given in Table V for compensating the wavefront aberration $W_{abb}$ shown in FIG. 4, respectively. These values have been calculated from ray-tracing simulations.

TABLE VI

| $OPD_{rms}[W_{abb}]$ | $OPD_{rms}\left[\sum_{m=1}^{M}\sum_{j=1}^{J_M} \Delta W_{m,j,2} + W_{abb}\right]$ |
|---|---|
| 61 mλ | 28 mλ |

It is noted that the value $$OPD_{rms}\left[\sum_{m=1}^{M}\sum_{j=1}^{J_M} \Delta W_{m,j,2} + W_{abb}\right]$$

corresponding to the compensation with the NPS 24 as given in Table V is lower than the value $$OPD_{rms}\left[\sum_{m=1}^{M}\sum_{j=1}^{J_M} \Delta W_{m,j,2} + W_{abb}\right]$$

given in Table IV (i.e. 30 mλ). In other words, the NPS 24 provided with the cover layer 90 improves the compensation of the wavefront aberration $W_{abb}$ with respect to the NPS 24 without the cover layer 90.

Also alternatively, a plurality of phase structures according to the invention may be provided with different optical elements or in one single body, wherein the phase structures have different materials.

Alternatives to the optical scanning device described above operate at modes different from the first and second mode described above, for instance in two modes with two different wavelengths (as described in the international application WO 01/48746 published on Jul. 5, 2001), in two modes with two different temperatures (as described in the European patent application EP 1.179.212 published on 13 Feb. 2002), two modes with two different angles of incidence (as described in said article by B. H. W. Hendriks et al., or in three modes with three different wavelengths (as described in the European patent application filed under the application number 02077992.2 on 22 Jul. 2002).

As another alternative of the optical scanning device described above, at least one of the polarizations of the radiation beams traversing the NPS is switched between a first state and a second state such that the NPS introduces a flat wavefront modification when that polarization is in the first state and an asymmetric wavefront modification when that polarization is in the second state. It is noted that the switching of each of the polarizations is known, e.g., from the European Patent application filed on Jul. 12, 2001 with the application number EP 01204786.6.

Alternatively, at least one of the polarizations is switched between a first state and a second state such that the NPS introduces a first asymmetric wavefront modification when that polarization is in the first state and a second, different wavefront modification when that polarization is in the second state.

It is noted that the phase structure described above in relation to an optical scanning device may be used for other optical applications, e.g. in microscopy and photography, operating in a first mode and in a second mode.

The invention claimed is:

1. An optical scanning device for scanning a first information layer by means of a first radiation beam in a first operating mode and a second information layer by means of a second radiation beam in a second operating mode, the device comprising:
   a radiation source for emitting said first and second radiation beams consecutively or simultaneously,
   an objective lens system for converging said first and second radiation beams on the positions of said first and second information layers, respectively, and
   a phase structure arranged in the optical path of said first and second radiation beams, the structure having an optical axis and including a central part ($P_1$) and at least one marginal part ($P_2$) for forming a non-periodic stepped profile in the radial direction, characterized in that one ($P_2$) of said central and marginal parts ($P_1$, $P_2$) is divided into at least a first angular segment ($AS_{2,1}$) and a second angular segment ($AS_{2,2}$) having a first step height ($h_{2,1}$) and a second, different step height ($h_{2,2}$), respectively, for introducing in said first operating mode a first wavefront modification $\Delta W_{2,1,1}$ and a second wavefront modification $\Delta W_{2,2,1}$, respectively, and in said second operating mode a third wavefront modification $\Delta W_{2,1,2}$ and a fourth wavefront modification $\Delta W_{2,2,2}$, respectively, where the difference $(\Delta W_{2,1,2} + \Delta W_{2,2,2}) - (\Delta W_{2,1,1} + \Delta W_{2,2,1})$ is asymmetric in respect of said optical axis (19).

2. An optical scanning device according to claim 1, wherein $(\Delta W_{2,1,2} + \Delta W_{2,2,2}) - (\Delta W_{2,1,1} + \Delta W_{2,2,1})$ is of the type of astigmatism, tilt, coma or clover.

3. An optical scanning device according to claim 1, wherein either the resulting wavefront modification $\Delta W_{2,1,1} + \Delta W_{2,2,1}$ in the first mode or the resulting wavefront modification $\Delta W_{2,1,2} + \Delta W_{2,2,2}$ in the second mode is substantially flat.

4. An optical scanning device according to claim 1, wherein said phase structure includes birefringent material sensitive to a first polarization ($p_1$) of said first radiation beam in said first mode and to a second, different polarization ($p_2$) of said second radiation beam in said second mode.

5. An optical scanning device according to claim 1, further including a cover layer arranged such that said phase structure forms a plate.

6. An optical scanning device according to claim 1, wherein said heights are designed such that the relative step heights ($h_{m,j+1}-h_{m,j}$; $h_{m+1,j}-h_{m,j}$) between adjacent steps ($AS_{m,j+1}, AS_{m,j}$; $AS_{m+1,j}, AS_{m,j}$) include a relative step height having an optical path substantially equal to $a\lambda_1$, wherein "a" is an integer and a>1 and "$\lambda_1$" is the wavelength of said first radiation beam.

7. An optical scanning device according to claim 1, wherein said phase structure is generally circular and said steps are generally annular.

8. An optical scanning device according to claim 1, wherein said phase structure is formed on a face of a lens of said objective lens system.

9. An optical scanning device according to claim 1, wherein said phase structure is formed on an optical plate provided between said radiation source and said objective lens system.

10. An optical scanning device according to claim 9, wherein said optical plate comprises a quarter wavelength plate or a beam splitter.

11. A phase structure operating in a first mode and in a second mode, the structure having an optical axis and including a central part ($P_1$) and at least one marginal part ($P_2$) for forming a non-periodic stepped profile in the radial direction, characterized in that one ($P_2$) of said central and marginal parts ($P_1$, $P_2$) includes at least a first segment ($AS_{2,1}$) and a second segment ($AS_{2,2}$) having a first step height ($h_{2,1}$) and a second, different step height ($h_{2,2}$), respectively, for introducing in said first operating mode a first wavefront modification $\Delta W_{2,1,1}$ and a second wavefront modification $\Delta W_{2,2,1}$, respectively, and in said second operating mode a third wavefront modification $\Delta W_{2,1,2}$ and a fourth wavefront modification $\Delta W_{2,2,2}$, respectively, where the difference $(\Delta W_{2,1,2}+\Delta W_{2,2,2})-(\Delta W_{2,1,1}+\Delta W_{2,2,1})$ is asymmetric.

12. A lens for use in an optical scanning device for scanning a first information layer by means of a first radiation beam in a first operating mode and a second information layer by means of a second radiation beam in a second operating mode, the lens being provided with a phase structure according to claim 11.

* * * * *